(12) United States Patent
Tamai et al.

(10) Patent No.: US 11,415,429 B2
(45) Date of Patent: Aug. 16, 2022

(54) CONTROL APPARATUS AND CONTROL SYSTEM

(71) Applicant: CLARION CO., LTD., Saitama (JP)

(72) Inventors: Yasuyuki Tamai, Tokyo (JP); Takashi Matsumoto, Tokyo (JP); Yasushi Nagai, Saitama (JP); Megumi Tsuchiyama, Saitama (JP)

(73) Assignee: CLARION CO., LTD., Saitama (JP)

( * ) Notice: Subject to any disclaimer, the term of this patent is extended or adjusted under 35 U.S.C. 154(b) by 564 days.

(21) Appl. No.: 16/344,113

(22) PCT Filed: Oct. 12, 2017

(86) PCT No.: PCT/JP2017/037032
§ 371 (c)(1),
(2) Date: Apr. 23, 2019

(87) PCT Pub. No.: WO2018/079285
PCT Pub. Date: May 3, 2018

(65) Prior Publication Data
US 2019/0323854 A1    Oct. 24, 2019

(30) Foreign Application Priority Data
Oct. 24, 2016    (JP) .............................. JP2016-208028

(51) Int. Cl.
*G01C 21/36* (2006.01)
*G06F 16/9535* (2019.01)
(Continued)

(52) U.S. Cl.
CPC ..... *G01C 21/3679* (2013.01); *G01C 21/3484* (2013.01); *G01C 21/3608* (2013.01);
(Continued)

(58) Field of Classification Search
CPC .................................................. G01C 21/3679
See application file for complete search history.

(56) References Cited

U.S. PATENT DOCUMENTS 6,385,535 B2 * 5/2002 Ohishi ................... G01C 21/36
701/425
8,082,098 B2 * 12/2011 Fukuda .................. G06Q 30/02
701/31.4
(Continued)

FOREIGN PATENT DOCUMENTS

EP    2 858 058 A1    4/2015
JP    2001-289661 A    10/2001
(Continued)

OTHER PUBLICATIONS

Extended European Search Report received in corresponding European Application No. 17864866.3 dated Mar. 18, 2020.
(Continued)

*Primary Examiner* — Michael A Berns
(74) *Attorney, Agent, or Firm* — Mattingly & Malur, PC

(57) ABSTRACT

A control apparatus includes: a user action estimation unit that estimates an expected passage route of a user based on a current position and an action history of the user; a sound signal input unit to which a sound signal based on the utterance of the user is input; a storage unit that stores a keyword and a POI related to the keyword; a keyword extraction unit that extracts the keyword from the sound signal; and a POI selection unit that selects a candidate POI as a candidate for a destination based on the expected passage route estimated by the user action estimation unit and the keyword extracted by the keyword extraction unit.

6 Claims, 19 Drawing Sheets

(51) Int. Cl.
  *G06F 16/9537* (2019.01)
  *G06F 16/29* (2019.01)
  *G01C 21/34* (2006.01)

(52) U.S. Cl.
  CPC .......... *G06F 16/29* (2019.01); *G06F 16/9535* (2019.01); *G06F 16/9537* (2019.01)

(56) References Cited

U.S. PATENT DOCUMENTS

| | | | | |
|---|---|---|---|---|
| 8,566,029 B1* | 10/2013 | Lopatenko | ............. | G01C 21/26 701/426 |
| 8,655,740 B2* | 2/2014 | Kameyama | ........ | G06Q 30/0601 705/26.1 |
| 8,781,716 B1* | 7/2014 | Wenneman | .......... | G08G 1/0129 701/118 |
| 9,230,556 B2* | 1/2016 | van Os | .............. | G01C 21/3629 |
| 9,506,766 B2* | 11/2016 | Kobayashi | ........... | G07C 5/0808 |
| 9,518,833 B2* | 12/2016 | Fink | .................... | G01C 21/3691 |
| 9,631,944 B2* | 4/2017 | Cho | ......................... | H04W 4/02 |
| 9,778,060 B2* | 10/2017 | Cheng | ................ | G01C 21/3641 |
| 2001/0053956 A1 | 12/2001 | Ohishi et al. | | |
| 2007/0118279 A1 | 5/2007 | Kudo | | |
| 2008/0228394 A1 | 9/2008 | Fukuda et al. | | |
| 2012/0054054 A1 | 3/2012 | Kameyama | | |

FOREIGN PATENT DOCUMENTS

| | | |
|---|---|---|
| JP | 2006-064440 A | 3/2006 |
| JP | 2008-026960 A | 2/2008 |
| JP | 2008-233258 A | 10/2008 |
| JP | 2012-053593 A | 3/2012 |

OTHER PUBLICATIONS

International Search Report of PCT/JP2017/037032 dated Dec. 19, 2017.

\* cited by examiner

FIG. 4

| LARGE CATEGORY | SMALL CATEGORY | UNIQUE NAME | LATITUDE AND LONGITUDE | | | | |
|---|---|---|---|---|---|---|---|
| CONVENIENCE STORE | XX GROUP | XX GROUP STORE IN FRONT OF P STATION | ..., ... | ... | ... | ... | ... |
| CONVENIENCE STORE | YY GROUP | YY GROUP STORE IN FRONT OF Q STATION | ..., ... | ... | ... | ... | ... |
| LEISURE | AGRICULTURAL EXPERIENCE FACILITY | R RANCH | ..., ... | ... | ... | ... | ... |
| SERVICE AREA | — | S SERVICE AREA | ..., ... | ... | ... | ... | ... |
| ... | ... | ... | ... | | | | |

601 — LARGE CATEGORY
602 — SMALL CATEGORY
603 — UNIQUE NAME
604 — LATITUDE AND LONGITUDE
605
606
607
608

FIG. 5

| HISTORY ID | ACTION HISTORY |
|---|---|
| 00001 | N01000, L00500, N01001, L00501 |
| 00002 | N01010, L00501, N01011, L00511 |
| ... | ... |

FIG. 6

| LARGE CATEGORY 611 | SMALL CATEGORY 612 | UNIQUE NAME 613 | POI INTRODUCTORY SENTENCE 614 | USER STATE 615 |
|---|---|---|---|---|
| — | — | R RANCH | ... | HUNGRY, COLD 621 |
| CONVENIENCE STORE | YY GROUP | — | ... | SLEEPY 622 |
| ... | ... | ... | ... | ... |

*FIG. 7*

| USER STATE | KEYWORDS | |
|---|---|---|
| FATIGUED | TIRED, TROUBLESOME, TAKE A BREAK | ~ 513 |
| SLEEPY | SLEEPY, COFFEE, CAFFEINE | ~ 514 |
| HUNGRY | SUSHI, WANT TO EAT, MEAT, WANT TO DRINK | ~ 515 |
| HOT | HOT, SWEAT, COOLER | ~ 516 |
| COLD | COLD, COCOA, AIR HEATING | ~ 517 |
| ... | ... | |

| SMALL CATEGORY | UNIQUE NAME | PRODUCT ID |
|---|---|---|
| — | R RANCH | d00001, d00002 |
| YY GROUP | — | f00001, f00002, f00003 |
| ... | ... | ... |

1001 — SMALL CATEGORY
1002 — UNIQUE NAME
1003 — PRODUCT ID
1004 — d00001, d00002
1005 — f00001, f00002, f00003

FIG. 13

| PRODUCT ID 1011 | PRODUCT NAME 1012 | PRODUCT INTRODUCTORY SENTENCE 1013 | USER STATE 1014 |
|---|---|---|---|
| d00001 | E FOOD | ... | COLD, HUNGRY, ANIMAL 1015 |
| d00002 | F EGG | ... | SOUVENIRS, SHOPPING, ANIMAL 1016 |
| f00001 | G DOLL | ... | HOT, KYUSHU, HUNGRY 1017 |
| f00002 | H RICE BALL | ... | FATIGUED, HUNGRY, LUNCH 1018 |
| f00003 | I COFFEE | ... | SLEEPY, FATIGUED, CAFFEINE 1019 |
| ... | ... | ... | ... |

FIG. 18

| 611 LARGE CATEGORY | 612 SMALL CATEGORY | 613 UNIQUE NAME | 614 POI INTRODUCTORY SENTENCE | 615 USER STATE | 616 MONTHLY ADVERTISEMENT RATE | 617 AREA |
|---|---|---|---|---|---|---|
| — | — | R RANCH | ... | HUNGRY, COLD | ¥500 | A,B,C,D |
| CONVENIENCE STORE | YY GROUP | — | ... | SLEEPY | ¥2,200 | B,E |
| ... | ... | ... | ... | ... | ... | ... |

631 — Monthly Advertisement Rate values
632 — Area values

CONTROL APPARATUS AND CONTROL SYSTEM

TECHNICAL FIELD

The present invention relates to a control apparatus and a control system.

BACKGROUND ART

There is known an in-vehicle device that has not only a guidance function to guide a vehicle to a point of interest (POI) set by a user but also a function of presenting candidates for a POI as a destination to a user.

PTL 1 discloses an information provision device including: a staying place setting unit that measures a movement-stop time as a time period from stop to resumption of movement of the device based on current location information acquired by a current location acquisition unit and sets a place where the movement-stop time is equal to or longer than a predetermined staying time as a staying place of the user; and a search range setting unit, wherein the search range setting unit estimates an aggregate area that includes all staying places of the user from position data corresponding to a plurality of staying places preset by the staying place setting unit as the user's living sphere and sets the living sphere as a search range.

CITATION LIST

Patent Literature

PTL 1: JP 2012-53593 A

SUMMARY OF INVENTION

Technical Problem

The invention described in PTL 1 focuses on past actions of the user, which does not allow the selection of a POI based on the current information on the user.

Solution to Problem

A control apparatus according to a first aspect of the present invention includes: a user action estimation unit that estimates an expected passage route of a user based on a current position and an action history of the user; a sound signal input unit to which a sound signal based on utterance of the user is input; a storage unit that stores a keyword and a POI related to the keyword; a keyword extraction unit that extracts the keyword from the sound signal; and a POI selection unit that selects a candidate POI as a candidate for a destination based on the expected passage route estimated by the user action estimation unit and the keyword extracted by the keyword extraction unit.

A control system according to a second aspect of the present invention is a control system including the control apparatus according to the first aspect and a server connected to the control apparatus via a network. The control system includes: a user action estimation unit that estimates an expected passage route of a user based on a current position of the control apparatus and an action history of the user; a sound signal input unit to which a sound signal based on utterance of the user is input; a storage unit that stores a keyword and a POI related to the keyword; a keyword extraction unit that extracts the keyword from the sound signal; and a POI selection unit that selects a candidate POI as a candidate for a destination based on the expected passage route estimated by the user action estimation unit and the keyword extracted by the keyword extraction unit.

Advantageous Effects of Invention

According to the present invention, it is possible to select a POI suitable for a user based on past information on the user and current information on the user.

BRIEF DESCRIPTION OF DRAWINGS

FIG. 4 is a diagram illustrating an example of POI information stored in a POI storage unit.

FIG. 5 is a diagram illustrating an example of a user action history stored in a user action history storage unit.

FIG. 6 is a diagram illustrating an example of recommended POI information stored in the POI storage unit.

FIG. 7 is a diagram illustrating an example of user state correspondence information stored in a user state correspondence storage unit.

FIG. 12 is a diagram illustrating an example of POI product correspondence information stored in a POI product-related storage unit.

FIG. 13 is a diagram illustrating an example of recommended product information stored in a product information storage unit.

FIG. 18 is a diagram illustrating an example of recommended POI information stored in a POI storage unit according to a fourth embodiment.

DESCRIPTION OF EMBODIMENTS

First Embodiment

Hereinafter, a first embodiment of an in-vehicle terminal 10 as a control apparatus will be described with reference to FIGS. 1 to 10.

Figure 1:
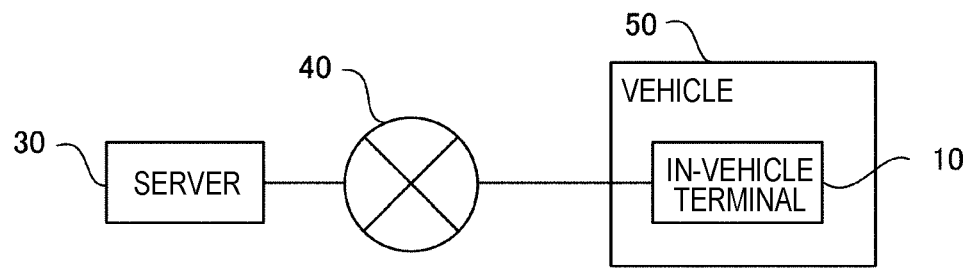
FIG. 1 is a configuration diagram of an information provision system 1.

FIG. 1 is a configuration diagram of an information provision system 1 including the in-vehicle terminal 10. The information provision system 1 includes the in-vehicle terminal 10, a server 30, a communication network 40, and a vehicle 50 on which the in-vehicle terminal 10 is mounted. The information provision system 1 provides a user of the in-vehicle terminal 10 riding in the vehicle 50 (hereinafter referred to as "user") with POI information suitable for the user based on the estimation of the state of the user and the estimation of the user's action.

The in-vehicle terminal 10 connects to the server 30 via the communication network 40 to acquire from the server information necessary for processing described later, such as POI information described later. The server 30 provides the POI information and the like to the in-vehicle terminal 10. The server 30 may be formed from a single server device or a plurality of server devices. The communication network 40 is a network in which computers and terminals can be connected together such as a telephone network or the Internet.

Figure 2:
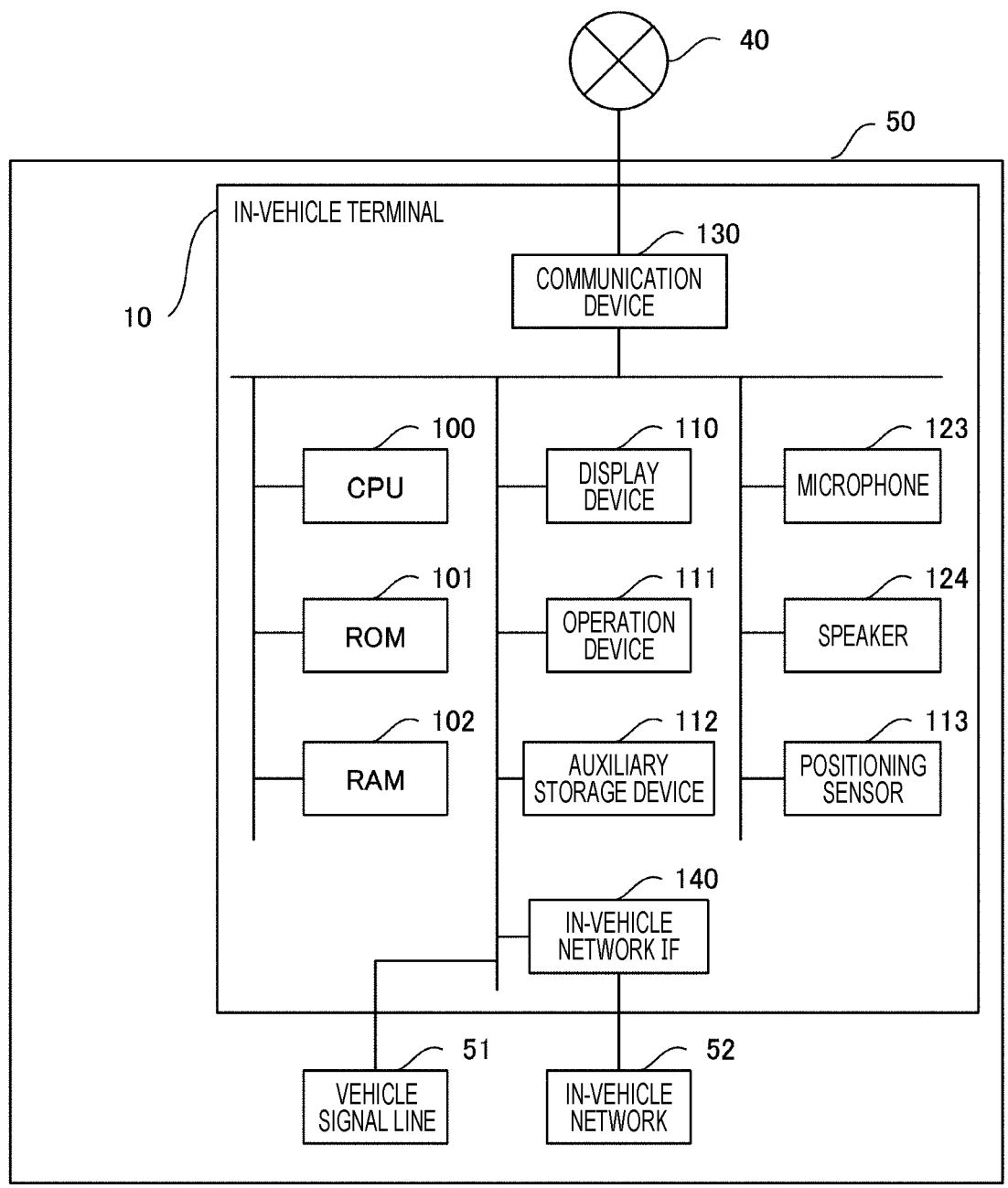
FIG. 2 is a hardware configuration diagram of an in-vehicle terminal.

FIG. 2 is a hardware configuration diagram of the in-vehicle terminal 10. The in-vehicle terminal 10 includes, as hardware, a CPU 100, a ROM 101, a RAM 102, a display device 110, an operation device 111, an auxiliary storage device 112, a positioning sensor 113, a microphone 123, a speaker 124, a communication device 130, and an in-vehicle network IF 140.

The CPU 100 develops a program stored in the ROM 101 into the RAM 102 and executes the program to operate a plurality of functional blocks described later. The CPU 100 controls each unit of the in-vehicle terminal 10. The program is stored in the ROM 101. The RAM 102 is used by the CPU 100. The program stored in the ROM 101 is read in the RAM 102, and work data and others necessary for executing this program are also stored in the RAM 102.

The display device 110 is a liquid crystal display, an organic electro-luminescence (EL) display, or the like, which displays image information to a user. The operation device 111 includes buttons, switches, a keyboard, a touch panel, or the like, and accepts an operation input by the user to the in-vehicle terminal 10. The auxiliary storage device 112 is a storage device that stores a program and data used by the program, and is a hard disk drive (HDD) or a solid state drive (SSD), for example. The data used by the program stored in the auxiliary storage device 112 is updated by newly receiving it from the server 30. Updating is triggered by a lapse of a certain time, reception of a command from the server 30, a command from the user, or the like.

The positioning sensor 113 measures its own position indicated by the latitude and longitude of the in-vehicle terminal 10. The microphone 123 collects utterances and sounds emitted from the user. The utterances of the user include, for example, a conversation with a fellow passenger or a soliloquy of the user. The speaker 124 outputs sound guidance at the time of routing assistance, operation sounds, and others.

The communication device 130 is a telematics control unit (TCU) or the like, and communicates with the server 30 via the communication network 40.

The in-vehicle network IF 140 is an interface for connecting the in-vehicle terminal 10 to an in-vehicle network 52. The in-vehicle terminal 10 captures information representing the running state and the internal state of the vehicle 50 via the in-vehicle network 52. The in-vehicle terminal 10 is also connected to a vehicle signal line 51, and can capture the running state and the internal state of the vehicle 50 via the vehicle signal line 51.

(Functional Configuration of in-Vehicle Terminal 10)

Figure 3:
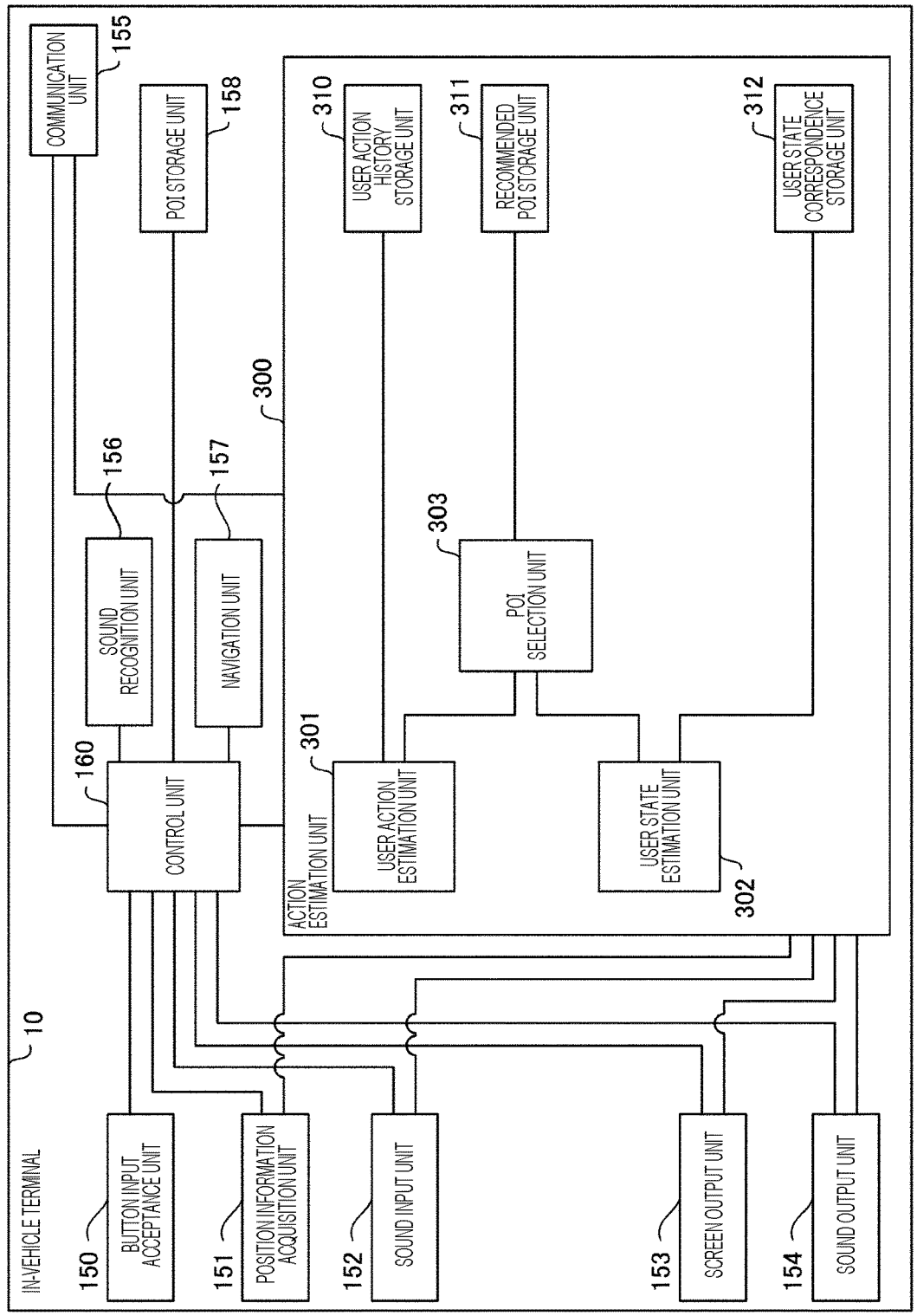
FIG. 3 is a functional block diagram illustrating a functional configuration of the in-vehicle terminal according to a first embodiment.

FIG. 3 is a functional block diagram illustrating the functional configuration of the in-vehicle terminal 10. The in-vehicle terminal 10 includes, as its functions, a button input acceptance unit 150, a position information acquisition unit 151, a sound input unit 152, a screen output unit 153, a sound output unit 154, a communication unit 155, a sound recognition unit 156, a navigation unit 157, a POI storage unit 158, and an action estimation unit 300.

The button input acceptance unit 150 is implemented by the operation device 111 and accepts an input by the user via a touch panel or a button. The position information acquisition unit 151 acquires information related to the position of the in-vehicle terminal 10 from the positioning sensor 113, the vehicle signal line 51, the in-vehicle network 52, and the like. The sound input unit 152 acquires utterances of the user and a fellow passenger riding in the vehicle 50 from the microphone 123. The screen output unit 153 outputs image data output from the navigation unit 157 and the action estimation unit 300 to the display device 110. The sound output unit 154 outputs sounds output from the navigation unit 157 and the action estimation unit 300 from the speaker 124.

The communication unit 155 connects the in-vehicle terminal 10 to the communication network 40 through the communication device 130, and acquires POI information and the like from the server 30.

The sound recognition unit 156 generates a character string from the sound signal (hereinafter referred to as "utterance character string") using a known sound recognition technique, and outputs the generated utterance character string to the action estimation unit 300 through the control unit 160. The sound recognition unit 156 receives the sound signal recording the utterance of the user input from the sound input unit 152.

The navigation unit 157 generates a route from the current position to the input destination and guides the user to the destination.

The POI storage unit 158 stores information on a POI that is possibly a destination on the map, that is, POI information. The POI information is information acquired from the server 30. The POI storage unit 158 is a storage area provided in the auxiliary storage device 112.

FIG. 4 is a diagram illustrating an example of POI information stored in the POI storage unit 158. The POI storage unit 158 stores a plurality of records, and each of these records corresponds to a POI. Each of the records includes fields of a large category 601, a small category 602, a unique name 603, and a latitude and longitude 604. In the field of the large category 601, an outline of the category classification related to the POI, for example, the general name of a facility and the type of industry is stored. In the field of the small category 602, details of the category classification related to the POI, for example, the name of the group company, etc. are stored. In the field of the unique name 603, the unique name of the POI is stored. In the field of latitude and longitude 604, the latitude and longitude indicating the location of the POI are stored.

In each of the records, values are input to the fields of the large category 601, the unique name 603, and the latitude and longitude 604, but values may not be input to the fields of the small category 602.

Returning to FIG. 3, the functional configuration of the in-vehicle terminal 10 will be described.

The action estimation unit 300 includes a user action estimation unit 301, a user state estimation unit 302, a POI selection unit 303, a user action history storage unit 310, a recommended POI storage unit 311, and a user state correspondence storage unit 312. The user action estimation unit 301, the user state estimation unit 302, and the POI selection unit 303 are functions executed by the CPU 100. The user action history storage unit 310, the recommended POI storage unit 311, and the user state correspondence storage unit 312 are storage areas provided in the auxiliary storage device 112.

The user action estimation unit 301 estimates a route that the user is supposed to pass through, that is, an expected passage route, based on the position information acquired from the position information acquisition unit 151 and the action history of the user stored in the user action history storage unit 310. The user state estimation unit 302 estimates the user state based on the utterance character string output from the sound recognition unit 156 and the information stored in the user state correspondence storage unit 312, and outputs the same to the POI selection unit 303. The POI selection unit 303 selects a POI as a destination candidate suitable for the user based on the expected passage route estimated by the user action estimation unit 301, the user state estimated by the user state estimation unit 302, the POI information stored in the POI storage unit 158, and recommended POI information stored in the recommended POI storage unit 311.

The user action history storage unit 310 stores a user action history that is a history of the user's movement when the user used the vehicle 50 in the past, that is, a plurality of pieces of position information. The user action history is accumulated by the action estimation unit 300 as the vehicle 50 runs. However, any unit other than the action estimation unit 300 such as the navigation unit 157 may accumulate the action history.

The recommended POI storage unit 311 stores recommended POI information including three items of information for identifying a POI to be recommended for a user, information on a POI, and information serving as a condition for selecting a POI. Whether to recommend a certain POI, in other words, whether to add information on a certain POI to the recommended POI information may be determined by the subjectivity of the editor who edits the recommended POI information, or objectively based on the reputation from the user. The recommended POI information is information acquired from the server 30.

The user state correspondence storage unit 312 stores user state correspondence information as information indicating the relationship between the state of the user and the keyword extracted from the utterance of the user. The user state correspondence information is acquired from the server 30.

Next, examples of the user action history, the recommended POI information, and the user state correspondence information will be described with reference to FIGS. 5 to 7, respectively. The outline of the operations of the user action estimation unit 301 and the user state estimation unit 302 will also be described.

FIG. 5 is a diagram illustrating an example of a user action history stored in the user action history storage unit 310. A plurality of records is stored in the user action history storage unit 310, and each record corresponds to one action history of the user. Each record in the user action history storage unit 310 includes a field of history ID 401 and a field of action history 402. In the field of the history ID 401, an identifier for identifying each action history is stored. In the field of the action history 402, information indicating the position where the user moved to in the past is stored in the order in which the user moved. In the example illustrated in FIG. 4, the position is indicated by a position code represented by a combination of one alphabetical character and a five-digit number, and the order of the location codes indicates that the user moved in that order. However, instead of the position code described above, the latitude and longitude may be stored as the position the user has moved.

For example, the user action estimation unit 301 estimates the expected passage route as described below. That is, the user action estimation unit 301 searches all the position information in the user action history for the position code closest to the current position of the vehicle 50 acquired from the position information acquisition unit 151. Then, the user action estimation unit 301 sets the position code included in the action history of the record including the closest position code as the expected passage route.

FIG. 6 is a diagram illustrating an example of the recommended POI information stored in the recommended POI storage unit 311. A plurality of records is stored in the recommended POI storage unit 311. Each of the records in the recommended POI storage unit 311 includes fields of a large category 611, a small category 612, a unique name 613, a POI introductory sentence 614, and a user state 615. The information stored in the fields of the large category 611, the small category 612, and the unique name 613 is information for specifying the POI, the information stored in the field of the POI introductory sentence 614 is information on the POI, the information stored in the field of the user state 615 is information to be used as a condition for selecting the POI.

The information stored in the fields of the large category 611, the small category 612, and the unique name 613 is similar to the information stored in the fields of the large category 601, the small category 602, and the unique name 603 of the POI information illustrated in FIG. 4. Words describing the POI are stored in the field of the POI introductory sentence 614. In the field of the user state 615, the user state as the state of the user to be the condition for recommending the POI is stored. The user state will be described later.

In the recommended POI information, a plurality of POIs may exist corresponding to one record. In the example illustrated in FIG. 6, a record 621 indicates a POI whose unique name is "R ranch". If there is a plurality of ranches of the same name, all of them are POIs corresponding to the record 621. In addition, only the fields of the large category 611 and the small category 612 are specified in a record 622 of FIG. 6, and thus all the POIs matching the large category and the small category irrespective of the unique name are POIs corresponding to the record 622.

FIG. 7 is a diagram illustrating an example of the user state correspondence information stored in the user state correspondence storage unit 312. A plurality of records is stored in the user state correspondence storage unit 312. Each of the record in the user state correspondence storage unit 312 includes fields of a user state 511 and a keyword 512. Words describing the state of the user are stored in the field of the user state 511. In the field of the keyword 512, the keyword corresponding to the user state stored in the field of the user state 511 of the same record is stored. For example, as illustrated in a record 513 of FIG. 7, the user state "fatigued" corresponds to the keywords "tired, troublesome, take a break".

The user state estimation unit 302 estimates the user state based on the utterance character string output from the sound recognition unit 156 and the information stored in the user state correspondence storage unit 312, and outputs the same to the POI selection unit 303. First, the user state estimation unit 302 extracts the keywords described in the field of the keyword 512 of all records in the user state correspondence storage unit 312, and stores them in advance as a keyword list. Next, the user state estimation unit 302 searches the utterance character string output from the sound recognition unit 156 for a keyword included in the keyword list. When the corresponding keyword is found in the search, the user state estimation unit 302 refers to the user state correspondence information, specifies the user state corresponding to the found keyword, and outputs the user state to the POI selection unit 303.

(Outline of Operations of the in-Vehicle Terminal)

Figure 8:
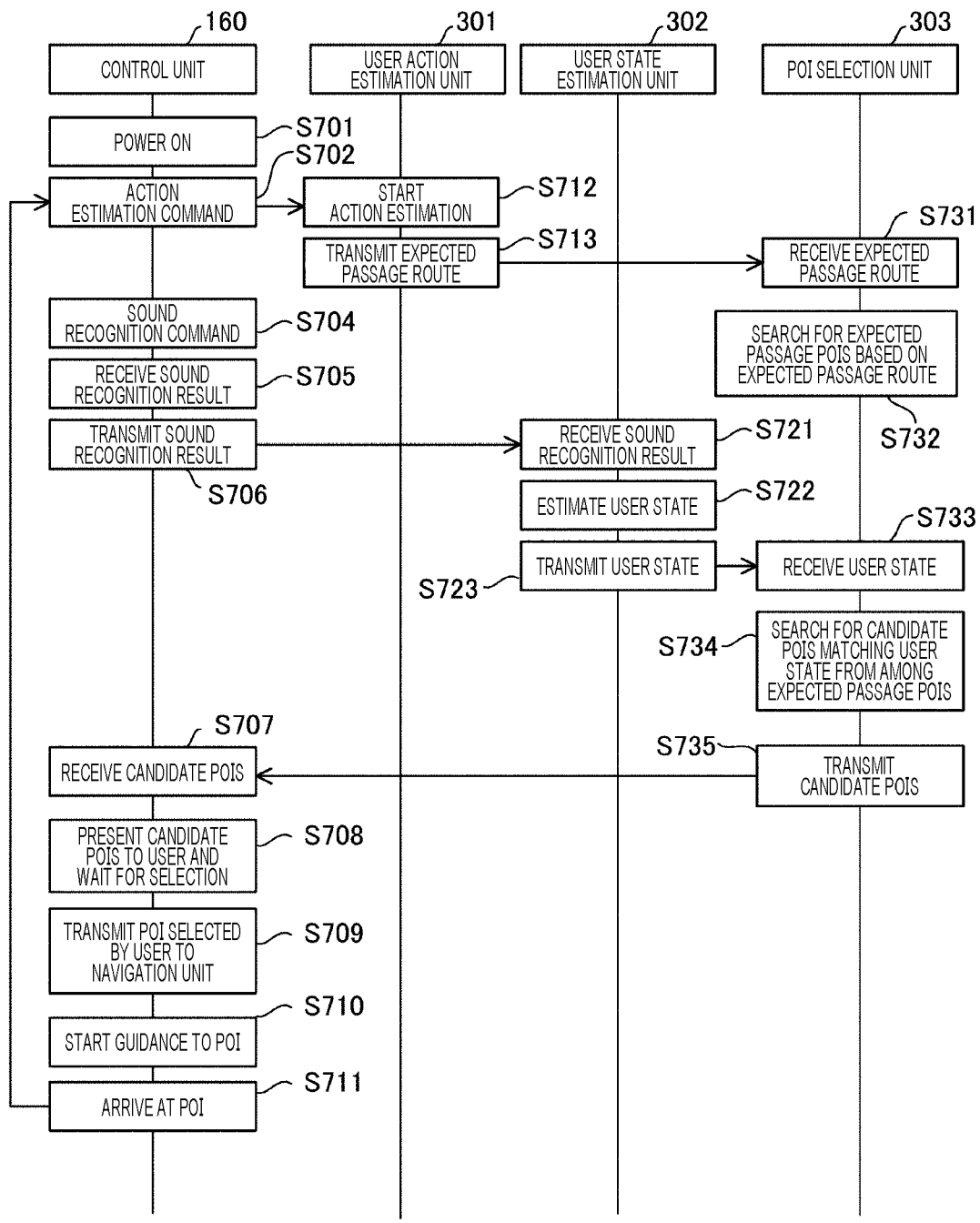
FIG. 8 is a diagram illustrating a time chart of the in-vehicle terminal according to the first embodiment.

FIG. 8 is a diagram illustrating a time chart of the in-vehicle terminal 10. The outline of the operations of the in-vehicle terminal 10 will be described with reference to the time chart. Referring to FIG. 8, the time elapses from the top to the bottom.

First, when the in-vehicle terminal 10 is powered on by the user's operation, the control unit 160 starts operation (S701). Then, the control unit 160 outputs an action estimation command to the user action estimation unit 301 (S702). Further, the control unit 160 causes the sound recognition unit 156 to start sound recognition (S704).

Upon reception of the action estimation command from the control unit 160, the user action estimation unit 301 estimates the user action based on the position of the in-vehicle terminal 10 output by the position information acquisition unit 151 and the user action history stored in the user action history storage unit 310, and estimates the expected passage route (S712). Then, the user action estimation unit 301 outputs the obtained expected passage route to the POI selection unit 303 (S713).

Upon reception of the expected passage route from the user action estimation unit 301 (S731), the POI selection unit 303 refers to the POI information stored in the POI storage unit 158 and the position of the in-vehicle terminal 10 output by the position information acquisition unit 151 to search for a POI satisfying the following condition. Specifically, the POI selection unit 303 searches for POIs that are located near the expected passage route, that is, within a predetermined distance from the expected passage path and that can be reached within a predetermined time from the current position (hereinafter referred to as "expected passage POIs") (S732). When the position of the in-vehicle terminal 10 output by the position information acquisition unit 151 changes, the POI selection unit 303 performs a search again and updates the expected passage POIs described above.

Upon reception of the sound recognition result from the sound recognition unit 156 (S705), the control unit 160 outputs the received sound recognition result to the user state estimation unit 302 (S706).

Upon reception of the sound recognition result output by the control unit 160 (S721), the user state estimation unit 302 estimates the user state based on the sound recognition result and the user state correspondence information stored in the user state correspondence storage unit 312 (S722). Then, the user state estimation unit 302 transmits the estimated user state to the POI selection unit 303 (S723).

Upon reception of the user state from the user state estimation unit 302 (S733), the POI selection unit 303 search for POIs matching the user state received in S733 (hereinafter referred to as "candidate POIs") from among the expected passage POIs obtained in S732 (S734). Then, the POI selection unit 303 transmits the candidate POIs to the control unit 160 (S735).

Upon reception of the candidate POIs from the POI selection unit 303 (S707), the control unit 160 presents the candidate POIs to the user using the sound output unit 154 and waits for a user's selection (S708). However, at that time, the screen output unit 153 may also be used to present the candidate POIs to the user. When any one of the candidate POIs is selected by the user, the control unit 160 transmits the selected POI, as destination information, to the navigation unit 157 (S709). This user's selection may be accepted only from the sound input unit 152 or also from the button input acceptance unit 150.

Then, the control unit 160 causes the navigation unit 157 to start guidance to the selected POI (S710). The control unit 160 uses the output of the position information acquisition unit 151 to determine whether the vehicle 50 has arrived at the POI as the destination of the guidance. When determining that the vehicle 50 has arrived (S711), the control unit 160 starts action estimation again (S702).

(Flowchart of the POI Selection Unit)

Figure 9:
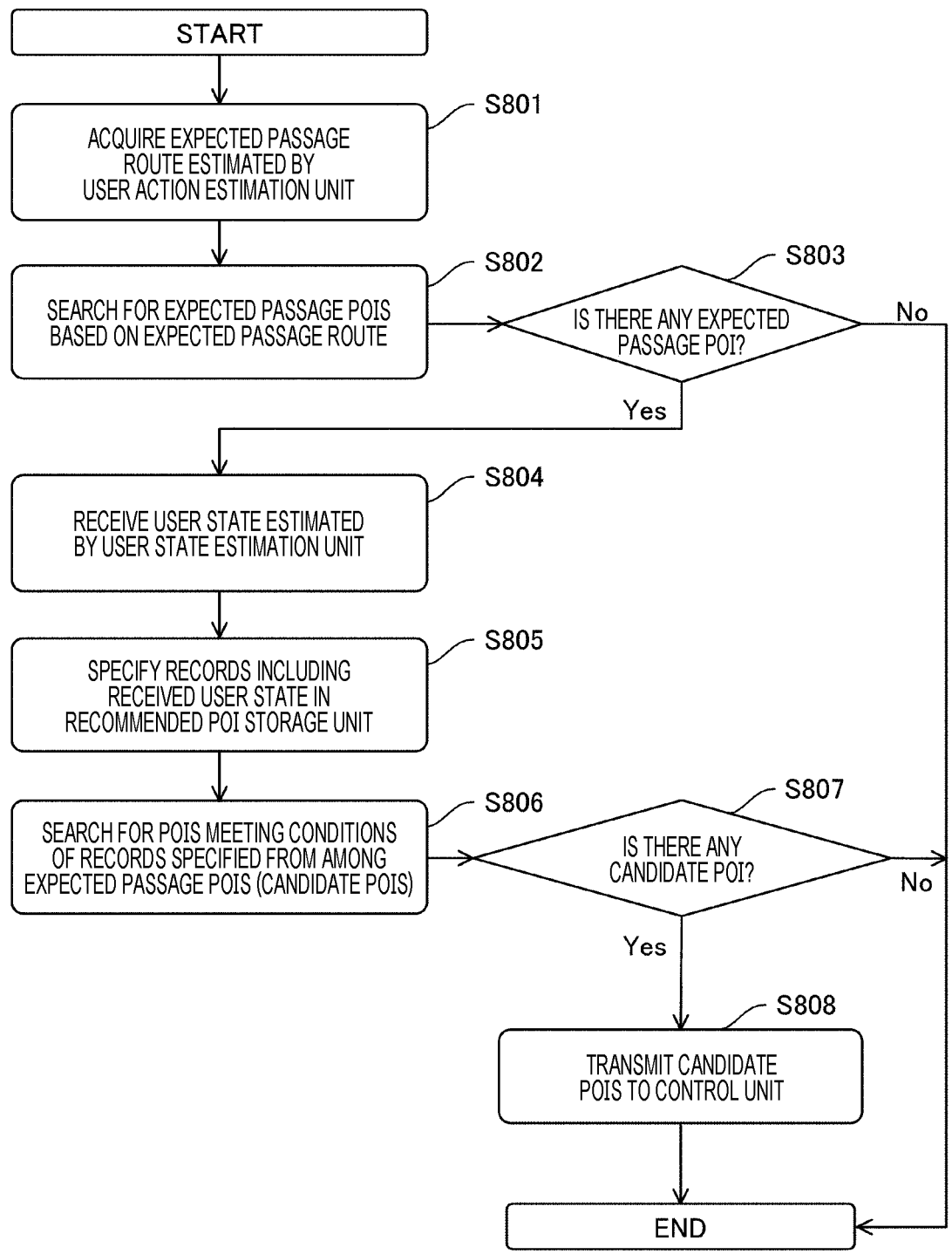
FIG. 9 is a flowchart illustrating the operations of a POI selection unit.

FIG. 9 is a flowchart illustrating the operations of the POI selection unit 303.

First, the POI selection unit 303 receives the expected passage route of the user from the user action estimation unit 301 (S801). Then, the POI selection unit 303 refers to the POI storage unit 158 and searches for a POI that is located near the expected passage route and can be reached within a predetermined time from the current position, that is, an expected passage POI (S802). Next, the POI selection unit 303 determines whether there are any expected passage POIs (S803). When determining that there is no expected passage POI, the POI selection unit 303 terminates the process. When determining that there is an expected passage POI, the POI selection unit 303 receives the user state estimated by the user state estimation unit 302 (S804).

Upon reception of the user state, the POI selection unit 303 refers to the recommended POI storage unit 311 and searches for a record including the user state received in the field of the user state 615 (S805). For example, when the received user state is "hungry", the record 621 illustrated in FIG. 6 matches the search condition; and when the received user state is "sleepy", the record 622 matches the condition. Next, the POI selection unit 303 searches the expected passage POIs obtained in step S802 as the population for the POIs corresponding to the record obtained in step S805, that is, the candidate POIs. For example, when the records 621 and 622 illustrated in FIG. 6 are obtained in S805 and all the POIs illustrated in FIG. 4 are the expected passage POIs, records 606 and 607 are obtained as candidate POIs. This is because the record 606 matches the large category and the small category which are conditions of the record 622, and the record 607 matches the unique name of the record 621.

Next, the POI selection unit 303 determines whether is any candidate POI, in other words, whether any POI corresponding to the condition has been obtained by the searching in S806 (S807). When determining that the candidate POI has been obtained, the POI selection unit 303 transmits the candidate POI to the in-vehicle terminal 10 (S808); and when not determining that no candidate POI has been obtained, the POI selection unit 303 terminates the process.

(Example of Operations)

An example of operations of the action estimation unit 300 will be described with reference to FIG. 8 and FIGS. 10(*a*) to 10(*c*). As a premise of this operation example, the POI information illustrated in FIG. 4 is stored in the POI storage unit 158, the recommended POI information illustrated in FIG. 6 is stored in the recommended POI storage unit 311, and the user state correspondence information illustrated in FIG. 7 is stored in the user state correspondence storage unit 312. In the following, the operation example will be described together with the step numbers in FIG. 8.

Figure 10:
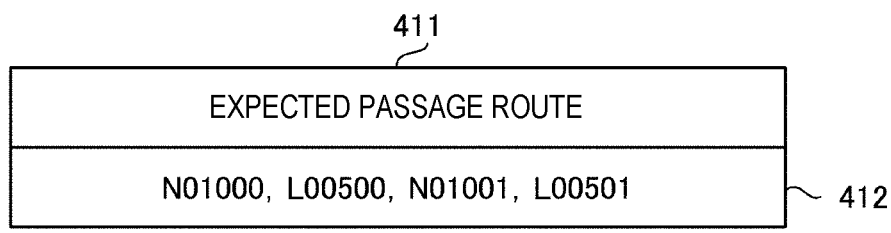
FIG. 10 is a diagram used for describing an operation example of an action estimation unit.
Figure 10:
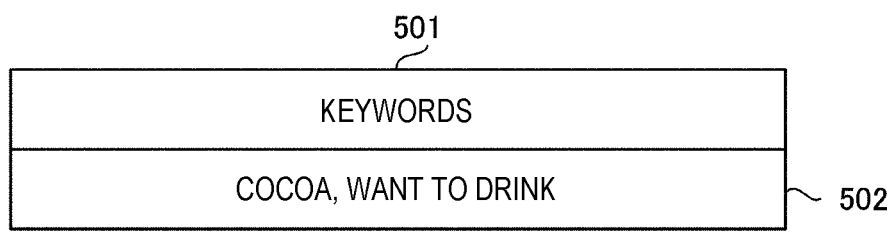
Figure 10:
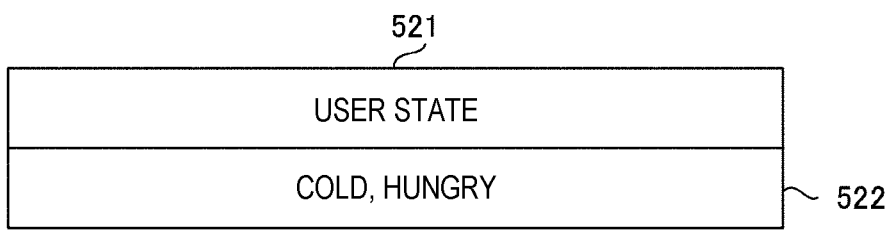

First, the control unit 160 outputs an action estimation command to the user action estimation unit 301 (S702), and the user action estimation unit 301 transmits the expected passage route illustrated in FIG. 10(*a*) to the POI selection unit 303 (S713). The POI selection unit 303 searches for the expected passage POI from the POI information based on the received expected passage route (S732). At this time, it is assumed that all the records illustrated in FIG. 4, that is, the four records 605 to 608 correspond to the expected passage POI.

The control unit 160 outputs a sound recognition command to the sound recognition unit 156 (S704), and transmits the received sound recognition result to the user state estimation unit 302 (S705 and S706).

The user state estimation unit 302 extracts the keywords illustrated in FIG. 10(*b*) from the character string output from the sound recognition unit 156 and refers to the user state correspondence storage unit 312 to specify the user state corresponding to the extracted keywords as illustrated in FIG. 10(*c*) (S722). The user state "cold" is specified from the keyword "cocoa" as illustrated in a record 517 of FIG. 7, and the user state "hungry" is specified from the keyword "want a drink" as illustrated in a record 515. Then, the user state estimation unit 302 transmits the specified user states to the POI selection unit 303 (S723).

From the recommended POI information, the POI selection unit 303 specifies the record 621 and the record 622 as records including the user state "cold" or "hungry". Then, the POI selection unit 303 specifies the record 606 and the record 607 from the POI information illustrated in FIG. 4 as the POIs corresponding to the specified records, and transmits the POIs of the records as the candidate POIs to the control unit 160 (S734 and 735).

The control unit 160 offers the information of the received candidate POIs to the user using the sound output unit 154 (S708). When the user selects one of the candidate POIs, the control unit 160 transmits the selected POI to the navigation unit 157 (S709) and causes the navigation unit 157 to start navigation (S710).

According to the first embodiment described above, the following operations and advantageous effects can be obtained:

(1) The control apparatus, for example, the in-vehicle terminal 10 includes: the user action estimation unit 301 that estimates the expected passage route of the user based on the current position and the action history of the user; the sound input unit 152 to which a sound signal based on the utterance of the user is input; the recommended POI storage unit 311 that stores keywords and POIs related to the keywords; the keyword extraction unit, that is, the user state estimation unit 302 that extracts a keyword from the sound signal; and the POI selection unit 303 that selects a candidate POI as a candidate for the destination based on the expected passage route estimated by the user action estimation unit 301 and the keyword extracted by the user state estimation unit 302.

The in-vehicle terminal 10 selects a POI based on the action history of the user and the keyword included in the utterance of the user. Accordingly, the in-vehicle terminal 10 can select a POI suitable for the user based on the accumulated past information on the user and the current information on the user.

(2) The auxiliary storage device 112 provides a storage area for the user state correspondence storage unit 312 that stores the user state correspondence information indicating the correspondence between the keywords and the user states, and provides a storage area for the recommended POI storage unit 311 that stores the recommended POI information indicating the correspondence between the user states and the POIs. The in-vehicle terminal 10 includes the user state estimation unit 302 that estimates the user state based on the user state correspondence information and the keywords extracted by the keyword extraction unit. The POI selection unit 303 searches for the expected passage POIs based on the expected passage route, and selects the POIs corresponding to the user state estimated by the user state estimation unit 302 from among the extracted expected passage POIs based on the recommended POI information, as the candidate POIs.

Therefore, it is possible to estimate the current state of the user from the utterance of the user, and select the POI matching the estimated user state.

(First Modification)

In the first embodiment described above, the POI selection unit 303 outputs, to the control unit 160, the POIs based on both the POI extraction condition based on the result of the estimation by the user action estimation unit 301 and the POI extraction condition based on the result of the estimation by the user state estimation unit 302, as the candidate POIs. In other words, the POI selection unit 303 extracts the expected passage POIs based on the result of the estimation by the user action estimation unit 301, and determines the POIs that are not only included in the expected passage POIs but also corresponding to the user state estimated by the user state estimation unit 302, as the candidate POIs. However, the POI selection unit 303 may also output POIs not satisfying the POI extraction condition based on the result of the estimation by the user state estimation unit 302 (hereinafter referred to as "preliminary POIs") to the control unit 160. However, the POI selection unit 303 transmits the candidate POIs and the preliminary POIs in such a manner that the control unit 160 can discriminate between the candidate POIs and the preliminary POIs.

Upon reception of the candidate POIs and the preliminary POIs, the control unit 160 notifies the user of the candidate POIs in priority to the preliminary POIs. This is because there is a high possibility that the candidate POIs are more suitable for the user than the preliminary POIs. The means for giving a higher priority to the candidate POIs is, for example, to output them earlier from the sound output unit 154, to increase the sound for them output from the sound output unit 154, or the like.

(Second Modification)

The in-vehicle terminal 10 may include no means for directly accessing the communication network 40, but may be connected to the communication network 40 via a communication terminal (not illustrated). In this case, the connection between the in-vehicle terminal 10 and the communication terminal is made by using the communication function usable for inter-terminal connection such as Universal Serial Bus (USB), Bluetooth (registered trademark), or a wireless Local area network (LAN). The communication terminal may distribute the POI information and the like to the in-vehicle terminal 10 by substituting the function of the server 30.

(Third Modification)

The in-vehicle terminal 10 may include a biometric sensor, and the user state estimation unit 302 may estimate the user state using the biometric sensor. The estimation of the user state by the biometric sensor may be performed by the biometric sensor alone, or the user state may be estimated in combination with the result of the sound recognition. The biological sensor here is a sensor for measuring biological signals such as body temperature, blood pressure, heart rate, and electroencephalogram. Alternatively, instead of the in-vehicle terminal 10, the vehicle 50 may include a biometric sensor and the in-vehicle terminal 10 may estimate the user state using the biometric sensor included in the vehicle 50.

(Fourth Modification)

In the first embodiment described above, the utterance of the user is assumed to be a conversation with a fellow passenger or a soliloquy of the user. However, the in-vehicle terminal 10 may have a dialog function unit, and the in-vehicle terminal 10 may estimate the state of the user through a conversation with the user. The dialog function unit stores a question list created in advance, and asks questions to the user by using this question list.

According to a fourth modification, the in-vehicle terminal 10 urges the user to speak so as to positively obtain user information. Furthermore, the in-vehicle terminal 10 can lead conversations so as to derive information on the state of the user.

Second Embodiment

A second embodiment of an in-vehicle terminal 10 as a control apparatus will be described with reference to FIGS. 11 to 15. In the following description, the same reference numerals are given to the same constituent elements as those of the first embodiment, and the differences will mainly be described. The points not specifically described are the same as those of the first embodiment. The present embodiment is different from the first embodiment mainly in that information on products corresponding to the state of the user is also provided to the user.

The hardware configuration of the in-vehicle terminal 10 is the same as that in the first embodiment.

(Functional configuration of in-vehicle terminal 10)

Figure 11:
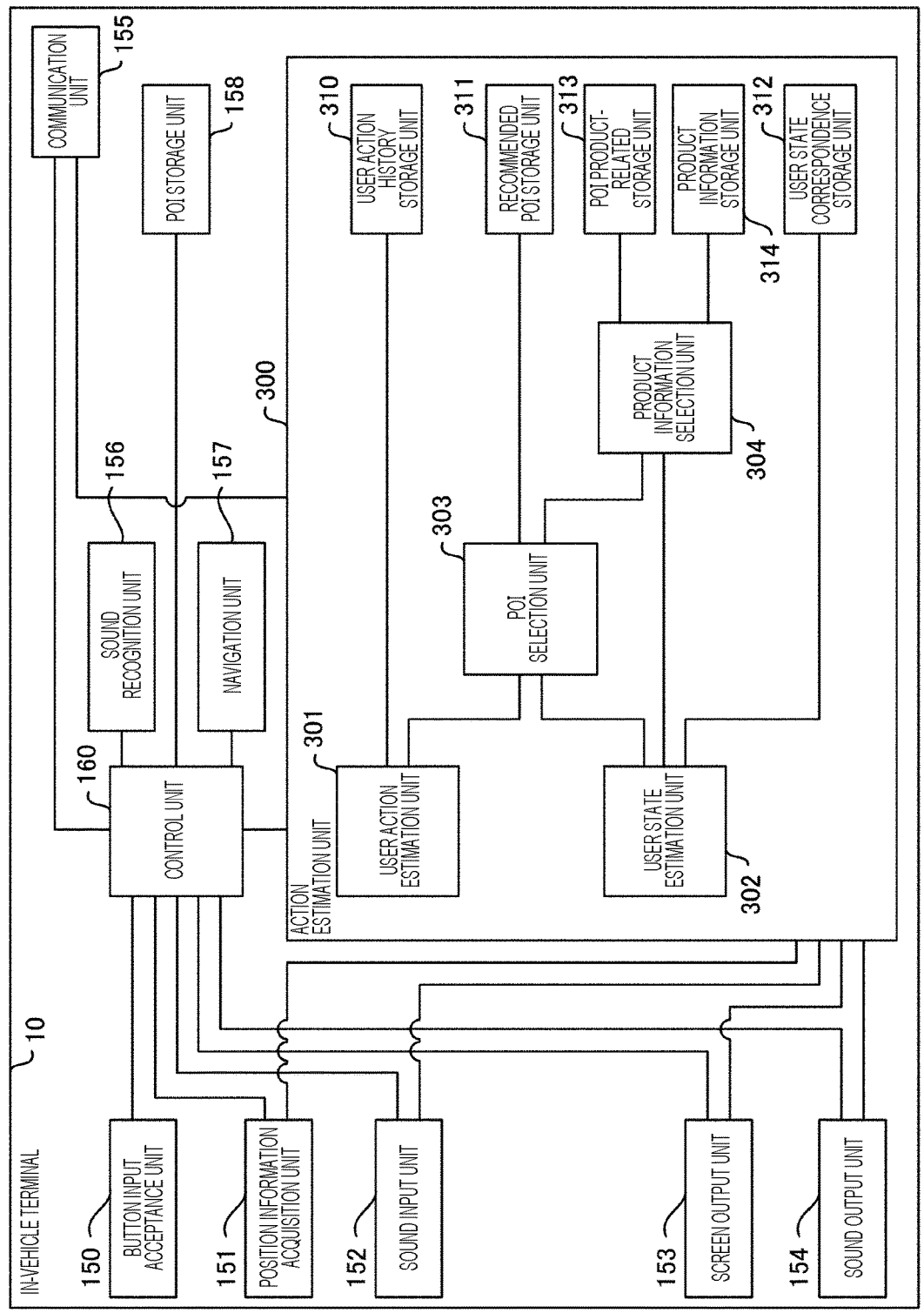
FIG. 11 is a diagram illustrating a functional configuration of an in-vehicle terminal according to a second embodiment.

FIG. 11 is a diagram illustrating a functional configuration of the in-vehicle terminal 10 according to the second embodiment. The difference from the first embodiment is that an action estimation unit 300 further includes a product information selection unit 304, a POI product-related storage unit 313, and a product information storage unit 314. In addition, user state correspondence information stored in a user state correspondence storage unit 312 is expanded as described below.

As the user state correspondence information in the present embodiment, items in which the user is currently interested are also stored in the same manner as the user state. For example, "animal" is estimated from the keywords "horse, cow, sheep", and information for estimating "souvenir" from keywords "travel, buy home" is stored as the user state correspondence information.

The product information selection unit 304 selects information on a product that is sold at the POI selected by the user and that matches the user state estimated by the user state estimation unit 302.

The POI product-related storage unit 313 and the product information storage unit 314 are storage areas provided in an auxiliary storage device 112.

The POI product-related storage unit 313 stores POI product correspondence information indicating the correspondence between POIs and products handled by the POIs.

FIG. 12 is a diagram illustrating an example of the POI product correspondence information stored in the POI product-related storage unit 313. Each of records in the POI product-related storage unit 313 includes fields of a small category 1001, a unique name 1002, and a product ID 1003. In the field of the small category 1001, as in the field of the small category 602 of the POI information, detailed information of the category classification related to the POI is stored. In the field of the unique name 1002 as in the field of the unique name 603 of the POI information, the unique name of the POI is stored. In the field of the product ID 1003, the identifier of the product is stored.

The product information storage unit 314 stores recommended product information that is information on products to be recommended to the user among products provided at the POI.

FIG. 13 is a diagram illustrating an example of the recommended product information stored in the product information storage unit 314. Each of the records in the POI product-related storage unit 313 includes fields of a product ID 1011, a product name 1012, a product introductory sentence 1013, and a user state 1014. In the field of the product ID 1011, the identifier of the product is stored like the product ID 1003 of the POI product correspondence information. In the field of product name 1012, the name of the product is stored. In the field of the product introductory sentence 1013, an introduction sentence of the product is stored. In the field of the user state 1014, the user state as the condition for recommending the product is stored.

(Outline of Operations of the in-Vehicle Terminal)

Figure 14:
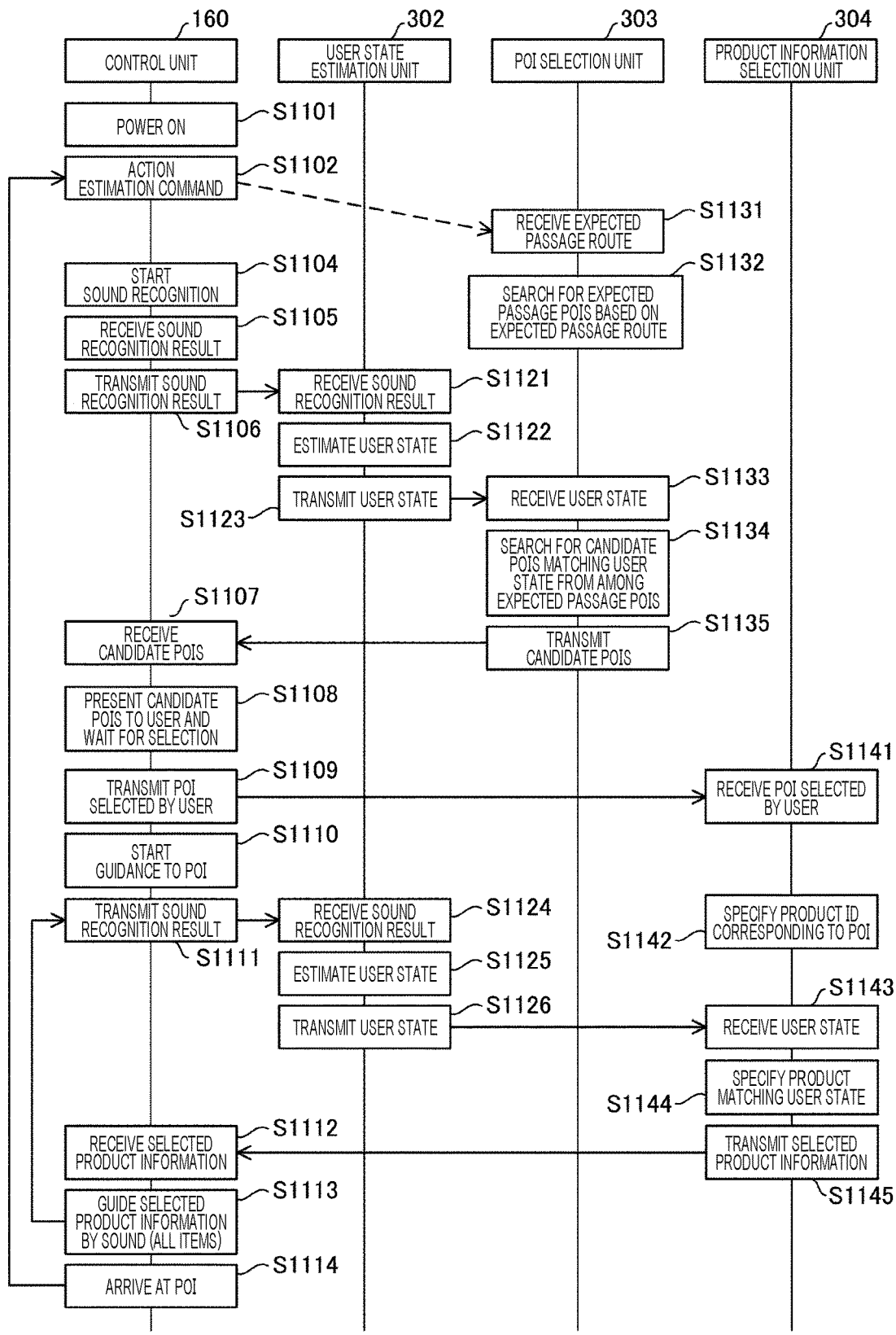
FIG. 14 is a time chart of the in-vehicle terminal according to the second embodiment.

FIG. 14 is a time chart of the in-vehicle terminal 10 in the second embodiment. The outline of the operations of the in-vehicle terminal 10 will be described with reference to the time chart. However, FIG. 14, does not illustrate the user action estimation unit 301 for the sake of space. The operations of the control unit 160, the user state estimation unit 302, and the POI selection unit 303 from the start to S1108 in the time chart illustrated in FIG. 14 are the same as the operations described above with reference to FIG. 8 in relation to the first embodiment, and thus descriptions thereof will be omitted.

In S1109, when any one of the candidate POIs is selected by the user, the control unit 160 transmits information specifying the selected POI, as destination information, to the navigation unit 157 and the product information selection unit 304. Then, the control unit 160 causes the navigation unit 157 to start guidance to the selected POI (S1110). Further, the control unit 160 receives the sound recognition result from the sound recognition unit 156 that is continuously operating and transmits the same to the user state estimation unit 302 (S1111).

Upon reception of the sound recognition result (S1124), the user state estimation unit 302 estimates the user state (S1125) and transmits the estimated user state to the product information selection unit 304 (S1126).

Upon reception of the information specifying the POI selected by the user (S1141), the product information selection unit 304 refers to the POI product-related storage unit 313 to specify the product ID corresponding to the POI selected by the user (S1142). Next, upon reception of the user state from the user state estimation unit 302 (S1143), the product information selection unit 304 refers to the product information storage unit 314 to specify the product matching the product ID and the user state condition (S1144). Specifically, the product information selection unit 304 specifies the product for which the product ID specified in S1142 is included in the field of the product ID 1011 and the user state received in S1143 is included in the field of the user state 1014. Then, the product information selection unit 304 transmits the information on the specified product to the control unit 160 (S1145).

Upon reception of the information on the product (S1112), the control unit 160 provides the received product information as guidance to the user by sound using the sound output unit 154 (S1113). This guidance is carried out for all received product information. Upon completion of this guidance, the process returns to the step (S1111) of receiving the sound recognition result from the sound recognition unit 156 and sending the same to the user state estimation unit 302. The control unit 160 uses the output of the position information acquisition unit 151 to determine whether the vehicle 50 has arrived at the POI as the destination of the guidance. When determining that the vehicle 50 has arrived (S1114), the control unit 160 starts action estimation again (S1102).

(Flowchart of the Product Selection Unit)

Figure 15:
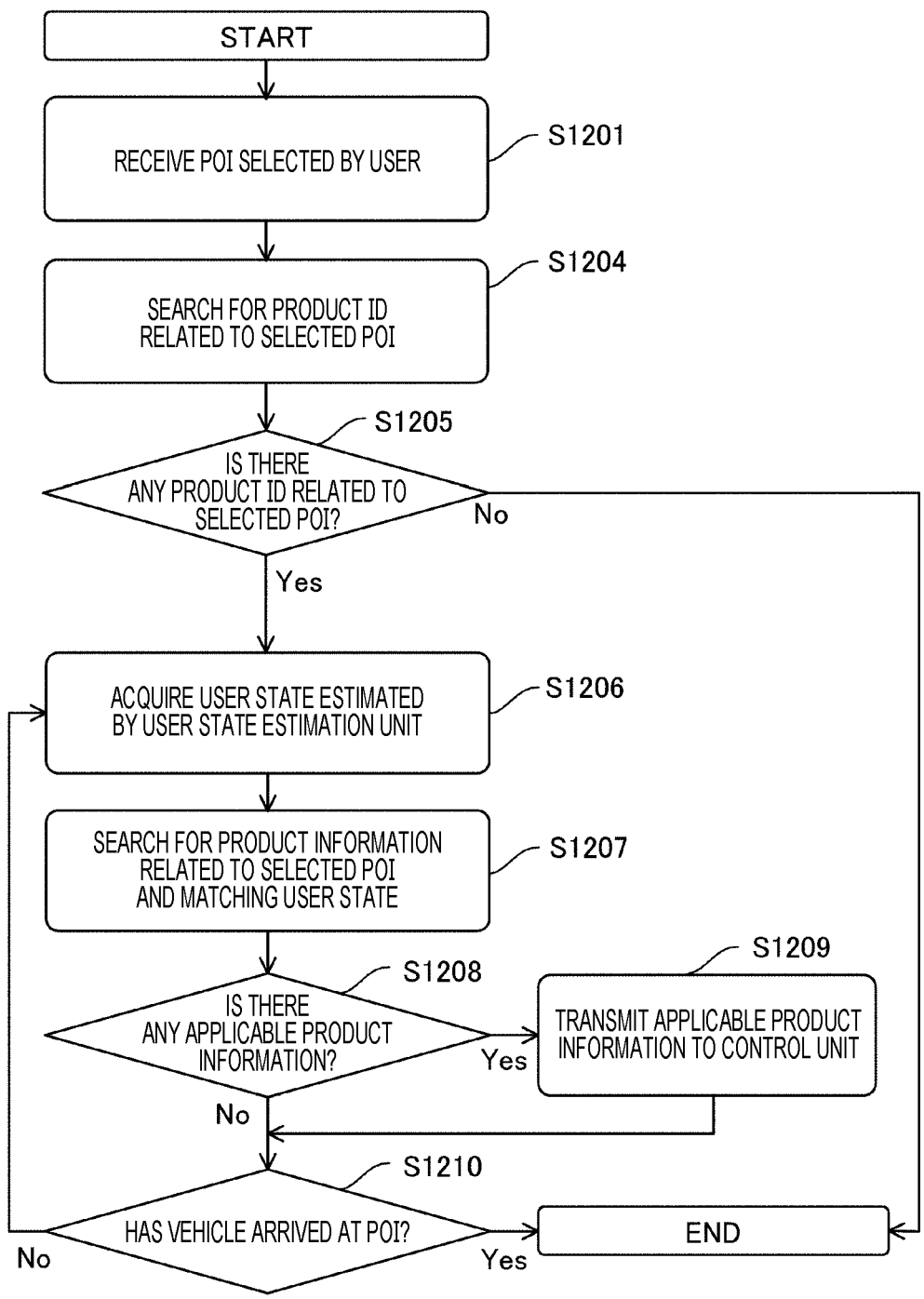
FIG. 15 is a flowchart illustrating the operations of a product information selection unit.

FIG. 15 is a flowchart illustrating the operations of the product information selection unit 304.

The product information selection unit 304 first receives information specifying the POI selected by the user from the control unit 160 (S1201). Next, the product information selection unit 304 refers to the POI product-related information to search for the product ID of a product related to the POI selected by the user (S1204). Then, the product information selection unit 304 determines whether there is any product ID related to the POI selected by the user (S1205). When determining that there is no product ID, the product information selection unit 304 terminates the process in the flowchart illustrated in FIG. 15. When determining that there is any product ID related to the POI selected by the user, the product information selection unit 304 acquires the user state from the user state estimation unit 302 (S1206).

Next, the product information selection unit 304 refers to the product information storage unit 314 to search for the product that matches the product ID found in the search in step S1204 and the condition of the user state acquired in step S1206 (S1207). When determining that there is any product matching the condition (S1208: YES), the product information selection unit 304 transmits the information on the product to the control unit 160 (S1209). Upon reception of the product information, the control unit 160 provides the user with the product information by using the sound output unit 154. When not determining that there is any product matching the condition (S1208: NO) or when step S1209 is completed, the product information selection unit 304 proceeds to step S1210. In step S1210, the product information selection unit 304 determines whether the user has arrived at the POI received in step S1201. When not determining that the user has arrived at the POI, the product information selection unit 304 returns to step S1206. When determining that the user has arrived at the POI, the product information selection unit 304 terminates the process in the flowchart illustrated in FIG. 15.

(Example of Operations of the Product Selection Unit)

Hereinafter, an operation example of the product information selection unit 304 will be described in correspondence with the flowchart illustrated in FIG. 15. The following description of the operations of the product information selection unit 304 is based on the assumption that the POI product correspondence information illustrated in FIG. 12 is stored in the POI product-related storage unit 313, the recommended product information illustrated in FIG. 13 is stored in the product information storage unit 314, and the user selects "R ranch".

Upon receipt of the information indicating "R ranch" from the control unit 160 (S1201), the product information selection unit 304 refers to the POI product-related storage unit 313 to search for the product ID related to "R ranch" (S1204). The product information selection unit 304 specifies "d00001" and "d00002" as product IDs corresponding to "R ranch" (S1205: YES), and then acquires the user state from the user state estimation unit 302 (S1206). The following description is based on the assumption that the acquired user state is "hungry".

The product information selection unit 304 refers to the product information storage unit 314 to search for the product ID including "hungry" as the condition of the user state between the two product IDs (S1207), and determines that the product with the product ID "d00001" matches the condition (S1208: YES). The product information selection unit 304 transmits the product information with the product ID "d00001" to the control unit 160.

The above steps consequently implement the output, by sound, of the information on the product related to the expected passage route estimated by the user action estimation unit 301 and the recommended POI selected from the user state estimated by the user state estimation unit.

According to the second embodiment described above, in addition to the operations and advantageous effects of the first embodiment, the following operations and advantageous effects can be obtained.

(3) The in-vehicle terminal 10 includes the information presentation unit, that is, the sound output unit 154 that presents a plurality of POIs selected by the POI selection unit 303 to the user, and the sound input unit 152 to which the user inputs information specifying any one of the plurality of POIs presented by the sound output unit 154. The product information selection unit 304 extracts products corresponding to the POI specified by the information input to the sound input unit 152, from among the plurality of POIs selected by the POI selection unit 303.

Therefore, the user can obtain the information on the products corresponding to the POI selected by himself/ herself.

First Modification of the Second Embodiment

The product information selection unit 304 may extract products corresponding to each POI included in the expected passage POIs and present the extracted products to the user. Further, when the user selects any one of the presented products, the control unit 160 may output the information on the POIs corresponding to the selected product, as the destination information, to the navigation unit 157.

According to the present modification, in addition to the operations and advantageous effects of the first embodiment, the following operations and advantageous effects can be obtained.

(4) In the auxiliary storage device 112, the POI product correspondence information indicating the correspondence between the POI and the product is stored. The in-vehicle terminal 10 includes the product information selection unit 304 that uses the POI product correspondence information to extract products corresponding to the POI selected by the POI selection unit 303.

Therefore, even when there is no selection by the user, the products corresponding to the POI selected by the POI selection unit 303 can be extracted so that the user can select the POI with reference to the extracted products.

Second Modification of the Second Embodiment

The POI selection unit 303 may output the preliminary POIs in addition to the candidate POIs to the control unit 160, as in the first modification of the first embodiment. In this case, when the user selects any one of the preliminary POIs, the product information selection unit 304 does not operate. When the user selects any one of the candidate POIs, the product information selection unit 304 operates as described above.

Third Embodiment

A third embodiment of an in-vehicle terminal 10 as a control apparatus will be described with reference to FIGS. 16 and 17. In the following description, the same reference numerals are given to the same constituent elements as those of the first embodiment, and the differences will mainly be described. The points not specifically described are the same as those of the first embodiment. The present embodiment is different from the first embodiment mainly in that a POI storage unit and an action estimation unit are provided in a server.

Figure 16:
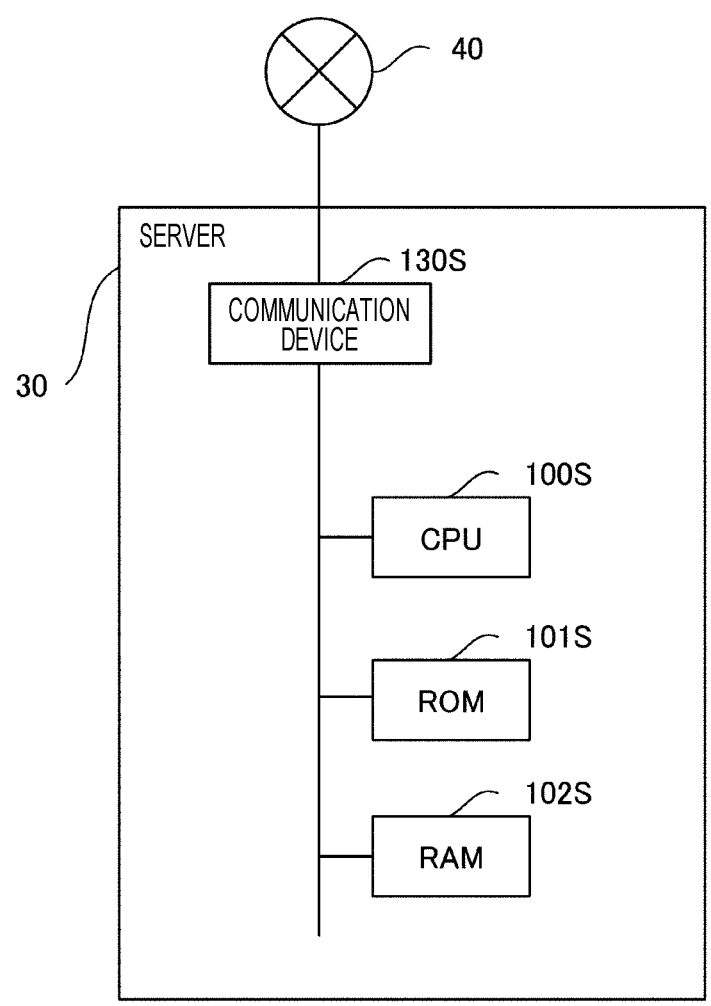
FIG. 16 is a hardware configuration diagram of a server according to a third embodiment.

FIG. 16 is a hardware configuration diagram of a server 30 according to the third embodiment. The server 30 includes, as hardware, a CPU 100S, a ROM 101S, a RAM 102S, and a communication device 130S.

The CPU 100S develops a program stored in the ROM 101S into the RAM 102S and executes the program to operate a plurality of functional blocks described later. The CPU 100S controls each unit of the server 30. The program is stored in the ROM 101S. The RAM 102S is used by the CPU 100S. The program stored in the ROM 101S is read in the RAM 102S, and work data and others necessary for executing this program are also stored in the RAM 102S.

Figure 17:
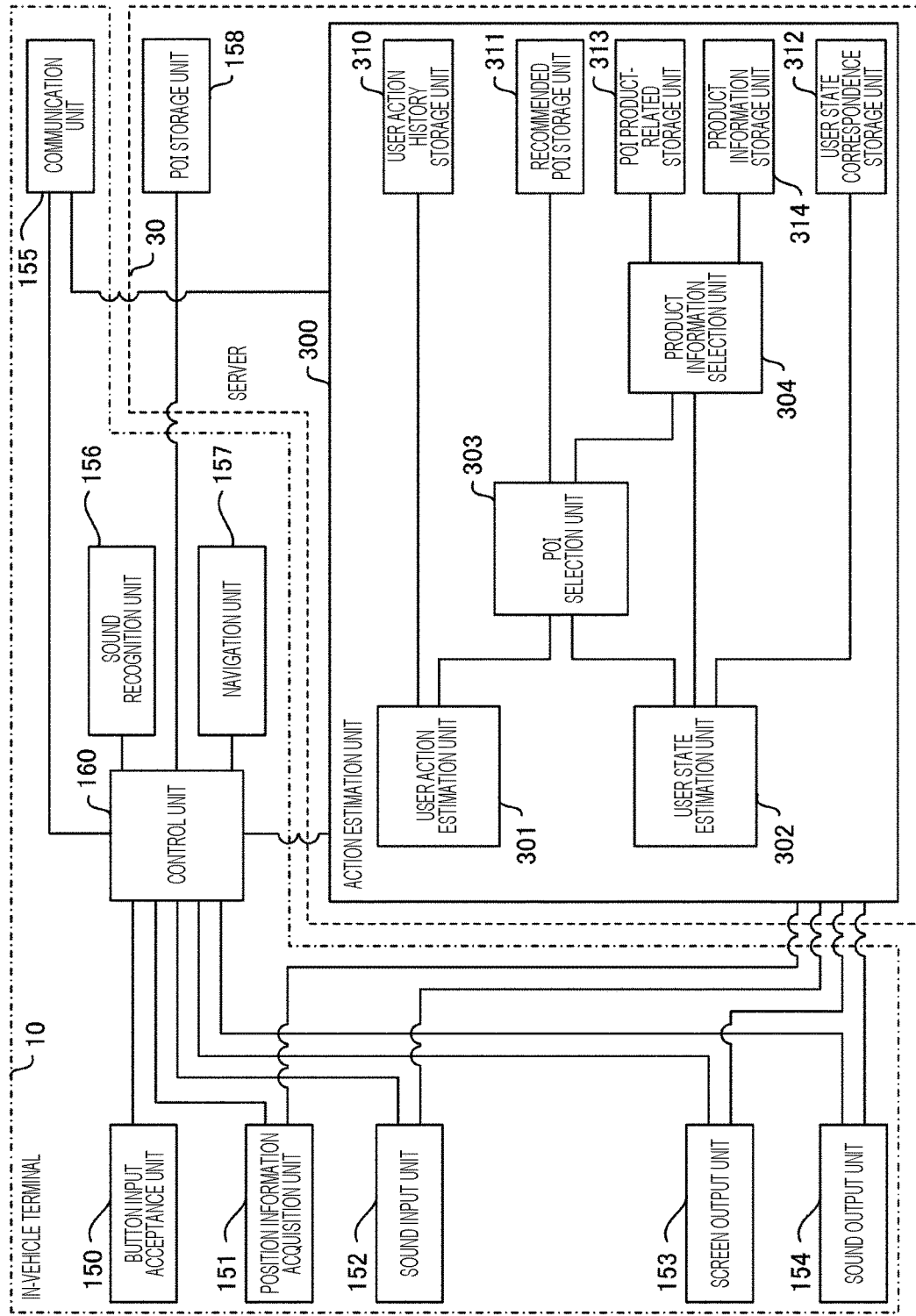
FIG. 17 is a functional block diagram illustrating a functional configuration of an in-vehicle terminal and the server according to the third embodiment.

FIG. 17 is a functional block diagram illustrating a functional configuration of an in-vehicle terminal 10 and the server 30 in the third embodiment. In FIG. 17, the section surrounded by a one-dot chain line indicates a functional block of the in-vehicle terminal 10, and the section surrounded by a broken line indicates a functional block of the server 30.

The in-vehicle terminal 10 includes a functional block in which the POI storage unit 158 and the action estimation unit 300 are eliminated from the configuration illustrated in FIG. 3 in the first embodiment. The server 30 includes a POI storage unit 158 and an action estimation unit 300. In the first embodiment, the communication between the control unit 160 and the POI storage unit 158 and the communication between the control unit 160 and the action estimation unit 300 are implemented by transmission and reception of signals inside the in-vehicle terminal 10. In the third embodiment, however, the communications described above are implemented as communication between the in-vehicle terminal 10 and the server 30 via a communication network 40. The operations of the action estimation unit 300 are the same as those of the first embodiment.

According to the third embodiment described above, in addition to the operations and advantageous effects of the first embodiment, the following operations and advantageous effects can be obtained.

(5) The information provision system 1 includes the in-vehicle terminal 10 and the server 30 connected to the in-vehicle terminal 10 via the communication network 40. The information provision system 1 includes: the user action estimation unit 301 that estimates the expected passage route of the user based on the current position of the in-vehicle terminal 10 and the action history of the user; the sound input unit 152 to which a sound signal based on the utterance of the user is input; the recommended POI storage unit 311 that stores keywords and POIs related to the keywords; the keyword extraction unit, that is, the user state estimation unit 302 that extracts a keyword from the sound signal; and the POI selection unit 303 that selects a candidate POI as a candidate for the destination based on the expected passage route estimated by the user action estimation unit 301 and the keyword extracted by the user state estimation unit 302.

Therefore, part of the in-vehicle terminal 10 can be included in the server 30 to reduce the processing load of the in-vehicle terminal 10. As described above, when the server includes the POI storage unit 158 and the action estimation unit 300, it is easy to update the information stored in the POI storage unit 158, the recommended POI storage unit 311, the user state correspondence storage unit 312, the POI product-related storage unit 313, and the product information storage unit 314.

First Modification of the Third Embodiment

The server 30 further includes the sound recognition unit 156, and the in-vehicle terminal 10 may not include the sound recognition unit 156. The server 30 further includes the navigation unit 157, and the in-vehicle terminal 10 may not include the navigation unit 157. That is, of the functional blocks included in the in-vehicle terminal 10 according to the first embodiment, the sound recognition unit 156, the navigation unit 157, the POI storage unit 158, and the action estimation unit 300 need to be included in either the in-vehicle terminal 10 or the server 30. Further, in order to improve the availability, both of the in-vehicle terminal 10 and the server 30 may include these functional blocks.

Second Modification of the Third Embodiment

The action estimation unit 300 included in the server 30 may further include the product information selection unit 304, the POI product-related storage unit 313, and the product information storage unit 314 according to the second embodiment.

Fourth Embodiment

A fourth embodiment of an in-vehicle terminal 10 as a control apparatus will be described with reference to FIGS. 18 and 19. In the following description, the same reference numerals are given to the same constituent elements as those of the first embodiment, and the differences will mainly be described. The points not specifically described are the same as those of the first embodiment. The present embodiment is different from the first embodiment mainly in that priority is set for each of recommended POIs, and higher-priority POIs are presented to the user at higher frequencies.

The hardware configuration of an information provision system 1 and the configuration of functional blocks are the same as those of the first embodiment. However, the information stored in a POI storage unit 158 and the operations of a POI selection unit 303 are different from those in the first embodiment. The recommendation of POIs in the present embodiment includes a POI advertisement function.

FIG. 18 is a diagram illustrating an example of recommended POI information stored in the POI storage unit 158 according to the fourth embodiment. As compared with the recommended POI information in the first embodiment, the recommended POI information illustrated in FIG. 18 further includes a field of monthly advertisement rate 616 and a field of area 617. In the field of the monthly advertisement rate 616, a monthly advertisement rate for each area is stored. The value of the field of the monthly advertisement rate 616 is also treated as the priority of a POI. That is, as the advertisement fee is higher, the POI is treated with higher priority. In the field of the area 617, information for specifying the target area for displaying a POI as the recommended POI is stored. In the example illustrated in FIG. 18, there are four target areas "A, B, C, and D" for displaying "R ranch" as the recommended POI. The monthly advertisement rate for "R ranch" is 500 yen×4=2000 yen.

For example, the POI selection unit 303 selects both the POI corresponding to the record 631 and the POI corresponding to the record 632 illustrated in FIG. 18 as candidate POIs, based on the outputs of the user action estimation unit 301 and the user state estimation unit 302. In this case, when the current position of the vehicle 50 is in any one of the areas A, C, and D, the POI corresponding to the record 631 is given a higher priority; and when the current position of the vehicle 50 is in the area E, the POI corresponding to the record 632 is given a higher priority. This is because, when the current position of the vehicle 50 is not included in the area of a record, the record is handled in the same manner as in the case where it is not listed in the recommended POI information. In this case, when the current position of the vehicle 50 is in the area B, the POI corresponding to the record 632 is given a higher priority. This is because the value of the field of the monthly advertisement rate 616 is higher in the record 632.

Figure 19:
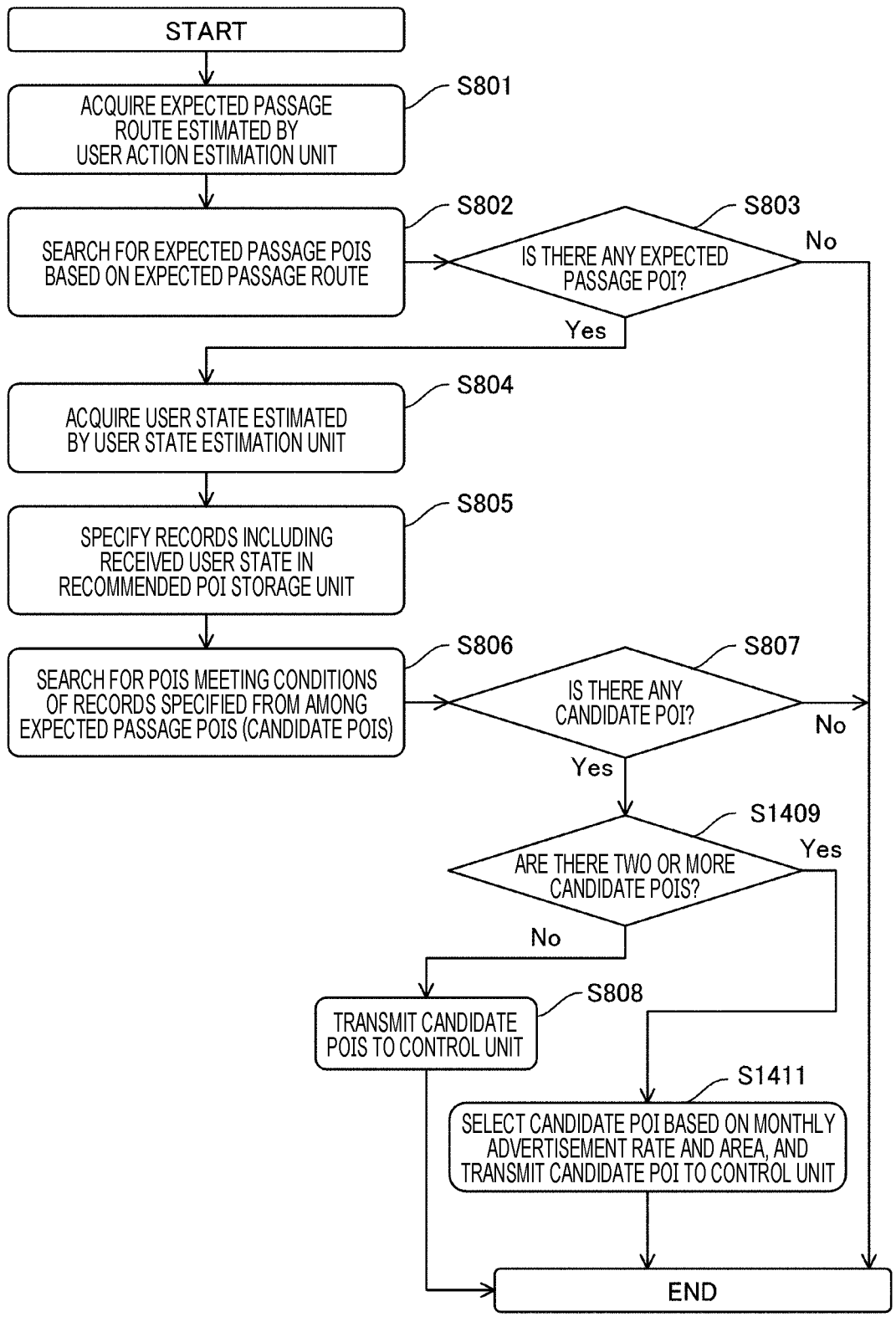
FIG. 19 is a flowchart illustrating the operations of a POI selection unit according to the fourth embodiment.

FIG. 19 is a flowchart illustrating the operations of the POI selection unit 303 in the fourth embodiment. Since steps S801 to S807 are the same as in the first embodiment, description thereof will be omitted.

In step S807, when determining that there is any candidate POI, the POI selection unit 303 proceeds to step S1409. Then, the POI selection unit 303 determines whether there is a plurality of candidate POIs (S1409). When determining that there is a plurality of candidate POIs, the POI selection unit 303 proceeds to step S1411. When determining that there is only one candidate POI, the POI selection unit 303 proceeds to step S808. In step S1411, the POI selection unit 303 refers to the recommended POI information for each of the plurality of candidate POIs, selects one of the candidate POIs based on the value of the field of the monthly advertisement rate 616 and the value of the field of the area 617, and transmits the selection to the control unit 160.

Details of step S1411 are as follows. The POI selection unit 303 first acquires the current position of the vehicle 50 from the position information acquisition unit 151. Then, the POI selection unit 303 determines whether the current position is included in the area 617 in the record of the recommended POI information corresponding to each of the candidate POIs. When the current position is included in the area 617 for a plurality of candidate POIs, the POI selection unit 303 selects a candidate POI with a high value of the field of the monthly advertisement rate 616. When the current position is included in the area 617 only for one candidate POI, the POI selection unit 303 selects the candidate POI. When the current position is not included in the area 617 for any candidate POI, the POI selection unit 303 does not select the candidate POI and does not transmit the candidate POI to the control unit 160.

According to the fourth embodiment described above, in addition to the operations and advantageous effects of the first embodiment, the following operations and advantageous effects can be obtained.

(6) The recommended POI information further includes information indicating the priority of selection for each POI, and the POI selection unit 303 selects the POI in consideration of the information indicating the priority.

Therefore, the in-vehicle terminal 10 can select the POI with higher priority and present the same to the user on a priority basis. For example, by associating the advertisement fee with the priority as in the present embodiment, it is possible to increase the opportunity of presenting the user with the POI that paid larger advertisement fee.

First Modification of the Fourth Embodiment

The recommended POI information may not include the field of the area 617 but only the field of the monthly advertisement rate 616 may be added to the recommended POI information in the first embodiment. In this case, the POI selection unit 303 selects the POI based on the value of the field of the monthly advertisement rate 616 regardless of the current position of the vehicle 50.

Second Modification of the Fourth Embodiment

In the fourth embodiment described above, the POI selection unit 303 selects only one POI with the highest priority, that is, the highest monthly advertisement rate, from among the plurality of POIs matching the conditions. However, the POI selection unit 303 may select a plurality of POIs in an order of priority. In this case, the control unit 160 presents the POIs so that the POI with a higher priority becomes stronger in appeal to the user. For example, the POI information is vocally read in descending order from the sound output unit 154. When the screen output unit 153 is used, the POI with a higher priority is displayed in a larger size.

In the in-vehicle terminal 10, the program is stored in the ROM 101, but the program may be stored in the auxiliary storage device 112. In addition, the in-vehicle terminal 10 may have an input/output interface (not illustrated), and the program may be read, as necessary, from another device via a medium that can be used by the input/output interface and the in-vehicle terminal 10. The medium here refers to, for example, a storage medium detachable to an input/output interface, or a communication medium, that is, a wired, wireless, or optical network, or a carrier wave or a digital signal propagating through the network. In addition, some or all of the functions performed by the program may be implemented by a hardware circuit or an FPGA.

The foregoing embodiments and modifications may be combined.

The various embodiments and modifications have been described so far, but the present invention is not limited to them. The present invention also includes other modes conceivable within the scope of the technical idea of the present invention.

The entire disclosure of the following application on the basis of which the priority is claimed is hereby incorporated by reference herein.

Japanese patent application No. 2016-208028 (filed on Oct. 24, 2016)

REFERENCE SIGNS LIST

1 information provision system
10 vehicle terminal
30 server
50 vehicle
151 position information acquisition unit
152 sound input unit
154 sound output unit
155 communication unit
158 POI storage unit 160 control unit
300 action estimation unit
301 user action estimation unit
302 user state estimation unit
303 POI selection unit
304 product information selection unit

The invention claimed is:

1. A control apparatus comprising:

a microphone;

a speaker;

a navigation unit;

a processor coupled to the speaker, the microphone and the navigation unit; a memory coupled the processor, the memory storing instructions that when executed configure the processor to:

estimate an expected passage route of a user based on a current position and an action history of the user, receive an input of a sound signal, via the microphone, based on utterance of the user, and generate a character string from the sound signal, store points of interest (POI) information including a category of a POI, a name of a POI and a location of POI for each of a plurality of POIs, user state correspondence information indicating a correspondence between predetermined keywords and a state of the user, and recommended POI information indicating a correspondence between the state of the user and the POI, search for the generated character string to find one or more of the predetermined keywords, estimate the state of the user based on the user state correspondence information and the found one or more keywords, search for expected passage POIs based on the expected passage route and the POI information, select the POI corresponding to the estimated state of the user based on the recommended POI information, as a candidate POI, select the POI not corresponding to the estimated state of the user, as a preliminary POI, from among the expected passage POIs found in the search for the expected passage POIs, transmit the selected candidate POI and the preliminary POI in such a manner that the candidate POI and the preliminary POI can be discriminated therebetween, output sound via the speaker notifying the user of the candidate POI in priority to the preliminary POI by increasing the sound of the candidate POI relative to the preliminary POI, and transmit a selected POI among the candidate POI and the preliminary POI output via the speaker to the navigation unit, wherein the navigation unit guides the user to the selected POI.

2. The control apparatus according to claim 1, wherein the processor is further configured to:

store POI product correspondence information indicating a correspondence between the POI and a product, and extract the product corresponding to the selected POI, using the POI product correspondence information.

3. The control apparatus according to claim 2, wherein the processor is further configured to:

output sound via the speaker information indicating a plurality of selected POIs to the user; and receive an input via the microphone specifying any one of the plurality of POIs output via the speaker, and extract the product corresponding to the POI specified by the information, from among the plurality of selected POIs.

4. A control system, comprising:

a microphone;

a speaker;

a navigation unit;

a processor coupled to the speaker, the microphone and the navigation unit;

a server connected to the processor via a network; and a memory coupled the processor, the memory storing instructions that when executed configure the processor to:

estimate an expected passage route of a user based on a current position of the control apparatus and an action history of the user, receive an input of a sound signal, via the microphone, based on utterance of the user, and generate a character string from the sound signal, store points of interest (POI) information including a category of a POI, a name of a POI and a location of POI for each of a plurality of POIs, user state correspondence information indicating a correspondence between predetermined keywords and a state of the user, and recommended POI information indicating a correspondence between the state of the user and the POI, search for the generated character string to find one or more of the predetermined keywords estimate the state of the user based on the user state correspondence information and the found one or more keywords, search for expected passage POIs based on the expected passage route and the POI information, select the POI corresponding to the estimated state of the user based on the recommended POI information, as a candidate POI, select the POI not corresponding to the estimated state of the user, as a preliminary POI, from among the expected passage POIs found in the search for the expected passage POIs, transmit the selected the candidate POI and the preliminary POI in such a manner that the candidate POI and the preliminary POI can be discriminated therebetween, output sound via the speaker notifying the user of the candidate POI in priority to the preliminary POI by increasing the sound of the candidate POI relative to the preliminary POI, and transmit a selected POI among the candidate POI and the preliminary POI output via the speaker to the navigation unit, wherein the navigation unit guides the user to the selected POI.

5. The control apparatus according to claim 1, further comprising:

a biometric sensor that measures biological signals of at least one of body temperature, blood pressure, heart rate, and electroencephalogram, wherein the processor is further configured to estimate the state of the user based on the user state correspondence information, the extracted keyword, and the measured biological signal.

6. A control system, comprising:
a microphone;
a speaker;
a navigation unit;
a processor coupled to the speaker, the microphone and the navigation unit;
a server connected to the processor via a network; and
a memory coupled the processor, the memory storing instructions that when executed configure the processor to:
estimate an expected passage route of a user based on a current position of the control apparatus and an action history of the user,
receive an input of a sound signal, via the microphone, based on utterance of the user, and generate a character string from the sound signal,
store a kcyword points of interest (POI) information including a category of a POI, a name of a POI and a location of POI for each of a plurality of POIs, user state correspondence information indicating a correspondence between predetermined keywords and a state of the user, and recommended POI information indicating a correspondence between the state of the user and the POI,
search for the generated character string to find one or more of the predetermined keywords
estimate the state of the user based on the user state correspondence information and the found one or more keywords,
search for expected passage POIs based on the expected passage route and the POI information,
select the POI corresponding to the estimated state of the user based on the recommended POI information, as a candidate POI,
select the POI not corresponding to the estimated state of the user, as a preliminary POI, from among the expected passage POIs found in the search,
transmit the selected candidate POI and the preliminary POI in such a manner that the candidate POI and the preliminary POI can be discriminated therebetween,
output sound via the speaker notifying the user of the candidate POI in priority to the preliminary POI by increasing the sound of the candidate POI relative to the preliminary POI, and
transmit a selected POI among the candidate POI and the preliminary POI output via the speaker to the navigation unit,
wherein the navigation unit guides the user to the selected POI.

* * * * *